(12) United States Patent
Oshima

(10) Patent No.: US 9,665,810 B2
(45) Date of Patent: May 30, 2017

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Minato-ku, Tokyo (JP)

(72) Inventor: Akihide Oshima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/219,290

(22) Filed: Mar. 19, 2014

(65) Prior Publication Data

US 2014/0333958 A1 Nov. 13, 2014

(30) Foreign Application Priority Data

May 7, 2013 (JP) ................................. 2013-097413

(51) Int. Cl.
*G06K 15/00* (2006.01)
*H04N 1/00* (2006.01)
*H04N 1/327* (2006.01)
*G06F 3/12* (2006.01)

(52) U.S. Cl.
CPC ..... *G06K 15/4045* (2013.01); *H04N 1/00217* (2013.01); *H04N 1/32797* (2013.01); *G06F 3/1203* (2013.01); *G06F 3/1236* (2013.01); *H04N 2201/0015* (2013.01); *H04N 2201/0039* (2013.01); *H04N 2201/0044* (2013.01)

(58) Field of Classification Search
CPC ....................................................... G06F 13/38
USPC ................................................. 358/1.15, 443
See application file for complete search history.

(56) References Cited

U.S. PATENT DOCUMENTS

| 2002/0063882 | A1* | 5/2002 | Sekiguchi | ............... H04L 29/06 358/1.15 |
| 2002/0181004 | A1* | 12/2002 | Morita | ............... H04N 1/00212 358/1.13 |
| 2004/0184095 | A1 | 9/2004 | Ogawa | |
| 2006/0012805 | A1* | 1/2006 | Liu | ............................. 358/1.6 |
| 2006/0056420 | A1 | 3/2006 | Okuda et al. | |
| 2006/0083261 | A1 | 4/2006 | Maeda et al. | |
| 2006/0084417 | A1* | 4/2006 | Melpignano | ........ H04L 12/5692 455/418 |

(Continued)

FOREIGN PATENT DOCUMENTS

| JP | 10-308767 A | 11/1998 |
| JP | 2000-253201 A | 9/2000 |

(Continued)

OTHER PUBLICATIONS

Communication dated May 24, 2016 from the Japanese Patent Office issued in corresponding Application No. 2013-097413.

*Primary Examiner* — Negussie Worku
(74) *Attorney, Agent, or Firm* — Sughrue Mion, PLLC

(57) ABSTRACT

An image processing apparatus includes plural communication interfaces, a determining unit, and a selecting unit. The determining unit determines whether or not communication with an information processing apparatus is executable by any of the plural communication interfaces. The selecting unit selects, based on a determination result generated by the determining unit, any one of the plural communication interfaces as a communication interface that communicates with the information processing apparatus.

6 Claims, 5 Drawing Sheets

(56) References Cited

U.S. PATENT DOCUMENTS

| | | | |
|---|---|---|---|
| 2006/0203282 A1* | 9/2006 | Iwai | 358/1.15 |
| 2007/0014620 A1* | 1/2007 | Sugimoto | B41J 29/393 400/691 |
| 2007/0067757 A1* | 3/2007 | Amemiya et al. | 717/136 |
| 2007/0087778 A1* | 4/2007 | Otsuka | H04L 41/082 455/550.1 |
| 2007/0124516 A1* | 5/2007 | Ohara et al. | 710/62 |
| 2007/0174441 A1* | 7/2007 | Okamoto | H04L 67/12 709/223 |
| 2009/0080014 A1* | 3/2009 | Kurokawa | G06F 21/6218 358/1.15 |
| 2009/0091782 A1* | 4/2009 | Okamoto | G06F 21/554 358/1.15 |
| 2009/0094241 A1* | 4/2009 | Oshima | H04L 63/0838 |
| 2010/0218007 A1* | 8/2010 | Oshima | G06F 1/3209 713/300 |
| 2011/0080910 A1 | 4/2011 | Shouno | |
| 2012/0140775 A1* | 6/2012 | Kawahara et al. | 370/437 |
| 2013/0215894 A1* | 8/2013 | Maezawa | H04L 29/06 370/392 |
| 2014/0132984 A1* | 5/2014 | Oshima | G06F 3/1207 358/1.15 |
| 2014/0136655 A1* | 5/2014 | Oshima | H04L 63/0823 709/217 |
| 2014/0355039 A1* | 12/2014 | Tsujimoto | G06F 3/1204 358/1.14 |
| 2016/0274828 A1* | 9/2016 | Oshima | G06F 3/126 |

FOREIGN PATENT DOCUMENTS

| | | |
|---|---|---|
| JP | 2006-86800 A | 3/2006 |
| JP | 2006-121192 A | 5/2006 |
| JP | 2011-82599 A | 4/2011 |

* cited by examiner

```
Tracing route to host2.isp.com [203.XXX.XXX.XXX]
over a maximum of 30 hops:

1    40 ms    40 ms    40 ms   rt1.isp.XX.jp [203.XXX.XXX.XXX]
  2    50 ms    50 ms    50 ms   rt2.isp.XX.jp [203.XXX.XXX.XXX]
  3    70 ms    70 ms    80 ms   gw.isp.com [203.XXX.XXX.XXX]
  4    70 ms    70 ms    70 ms   host2.isp.com [203.XXX.XXX.XXX]

Trace complete.
```

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-097413 filed May 7, 2013.

BACKGROUND

Technical Field

The present invention relates to an image processing apparatus, an image processing method, and a non-transitory computer readable medium.

SUMMARY

According to an aspect of the invention, there is provided an image processing apparatus including plural communication interfaces, a determining unit, and a selecting unit. The determining unit determines whether or not communication with an information processing apparatus is executable by any of the plural communication interfaces. The selecting unit selects, based on a determination result generated by the determining unit, any one of the plural communication interfaces as a communication interface that communicates with the information processing apparatus.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the drawings.

Figure 1:
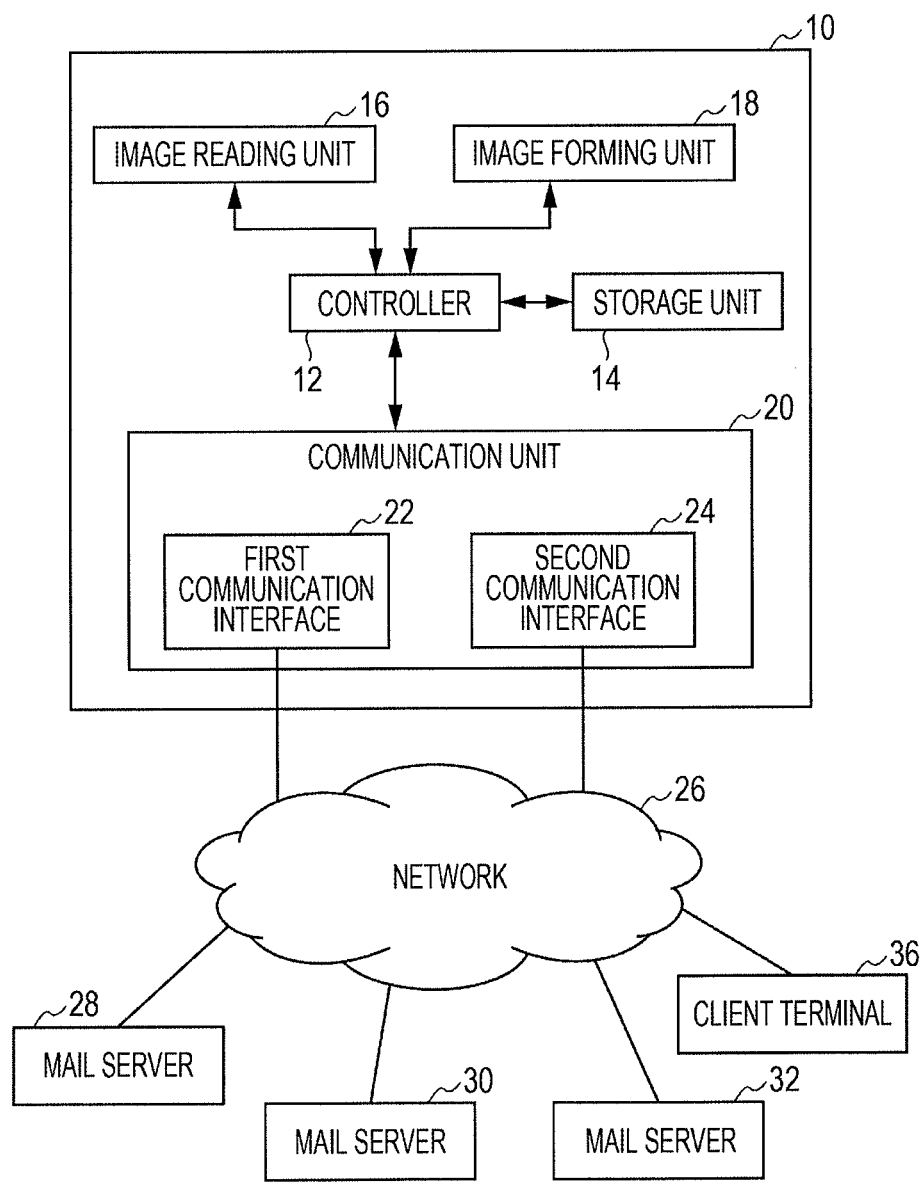
FIG. 1 is a diagram illustrating the hardware configuration of an image processing apparatus according to an exemplary embodiment of the present invention.

FIG. 1 is a diagram illustrating the hardware configuration of an image processing apparatus 10 according to the exemplary embodiment of the present invention. As illustrated in FIG. 1, the image processing apparatus 10 includes a controller 12, a storage unit 14, an image reading unit 16, an image forming unit 18, and a communication unit 20.

The controller 12 includes a central processing unit (CPU). The controller 12 executes a program stored in the storage unit 14 and controls the individual units of the image processing apparatus 10.

The storage unit 14 is constituted by various memories, such as a hard disk and a random access memory (RAM). The storage unit 14 is, for example, a storage medium that stores a program to be executed by the controller 12. Also, the storage unit 14 is used as a working memory of the controller 12. Various types of memories are applicable as the storage unit 14. For example, the storage unit 14 may be constituted by a storage device such as a semiconductor memory.

In this exemplary embodiment, programs and various pieces of data stored in the storage unit 14 may be obtained from an external apparatus via the communication unit 20, or may be obtained from an external storage medium.

The image reading unit 16 is constituted by a scanner or the like. The image reading unit 16 optically scans a target, such as a sheet, and thereby generates an image of the target. The image forming unit 18 is constituted by a printer or the like. The image forming unit 18 forms an image on a recording medium (for example, a sheet or film) by using image data obtained from the image reading unit 16 or the communication unit 20.

The communication unit 20 is constituted by a network interface card (NIC) or the like, and performs wired or wireless data communication with an external apparatus connected to the image processing apparatus 10. In this exemplary embodiment, the communication unit 20 includes plural communication interfaces. In this exemplary embodiment, a description will be given under the assumption that the communication unit 20 includes two communication interfaces (a first communication interface 22 and a second communication interface 24), but the number of physical interfaces included in the communication unit 20 is not limited. The first communication interface 22 and the second communication interface 24 are capable of communicating with one or more networks among plural types of networks. Examples of the networks include an intranet, an Internet service provider (ISP), a wireless local area network (LAN), and a local network (ad hoc connection using peer-to-peer communication with a device using a wireless scheme or the like). The individual networks are connected to one another.

The communication interfaces (the first communication interface 22 and the second communication interface 24) are devices for communicating with another information processing apparatus (a mail server, a terminal, etc.) via a network. For example, as illustrated in FIG. 1, mail servers 28, 30, and 32 and a client terminal 36 are connected to a network 26, which is connected to the communication interfaces, so that the individual device are capable of communicating with one another. Specifically, the first communication interface 22 supplies data received from the client terminal 36 to the controller 12. Also, the first communication interface 22 transmits data received from the controller 12 to the client terminal 36. The second communication interface 24 has a function similar to the function of the first communication interface 22.

Basically, the mail servers 28, 30, and 32 operate as servers for transmission and reception of emails, such as typical simple mail transfer protocol (SMTP) servers. The mail server 32 holds emails that are to be transmitted or that have been received in a storage device (not illustrated) serving as a spool device. Upon receiving an instruction to perform email transmission/reception processing from the client terminal 36, the mail server 32 performs email transmission/reception processing in response to the instruction. In this exemplary embodiment, plural types of mail servers exist. For example, the mail server 28 is a mail server that is installed in an intranet and that is used within a company, the mail server 30 is a mail server that is installed in a company and that is connected to the external Internet, and the mail server 32 is a mail server that is installed in cloud and that provides a service. The number of mail servers connected to each network is not limited to one, and may be two or more.

The client terminal 36 is an information processing apparatus operated by a user, for example, a personal computer, a mobile phone, or a portable information terminal (personal digital assistant (PDA)). Software for transmitting and receiving an email is installed in the client terminal 36, and the user of the client terminal 36 transmits and receives an email by using the software.

One of the processes performed by the image processing apparatus 10 is a process of transmitting scan data (so-called "scan to mail function"), in which image information read by the image reading unit 16 is transmitted to a destination information processing apparatus (in this exemplary embodiment, the mail server 28, 30, or 32) by being attached to an email. Normally, a transmitted email is held in the mail server corresponding to the domain name of the destination email address. In response to an email distribution request from the client terminal 36, the mail server transmits an email specified by the request to the client terminal 36. In this way, an email to be transmitted from the image processing apparatus 10 first reaches the mail server and is held therein, but the mail server varies depending on the destination of the email. The individual mail servers are installed in plural types of networks connected to one another, and thus it is difficult to select in advance a communication interface to be used in accordance with a destination email address. Further, in a case where an appropriate communication interface is not selected, a security problem may arise, that is, an email to be transmitted to a mail server installed in an intranet may be unexpectedly transmitted via the external Internet.

Accordingly, in this exemplary embodiment, in the case of performing a process of transmitting scan data, any one of the first communication interface 22 and the second communication interface 24 is selected and is used for transmitting an email.

Hereinafter, a description will be given of an example of a flow of a process of transmitting scan data performed by the image processing apparatus 10 according to this exemplary embodiment, with reference to the flowchart illustrated in FIG. 2. The process described below is performed by the controller 12 of the image processing apparatus 10 executing a program.

First, after an image has been read by the image reading unit 16, the controller 12 starts setting the destination of the read image data (S101). Specifically, the image data read by the image reading unit 16 is attached to an email, and a user inputs a destination email address of the email. The destination email address may be input before the image reading unit 16 reads an image. Here, the user may manually input the destination email address, or may select the destination email address from a list of pre-registered email addresses.

The controller 12 obtains the destination email address input by the user, and inquires the domain name of the destination email address via the first communication interface 22 and the second communication interface 24 (S102).

Figure 3:
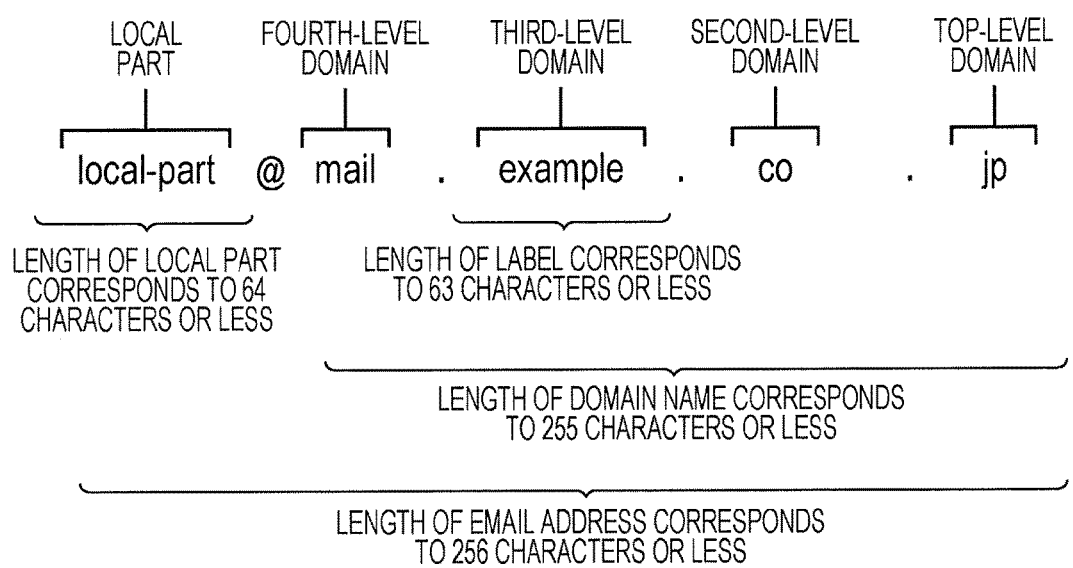
FIG. 3 is a diagram illustrating the structure of a domain name of an email address.

FIG. 3 illustrates an example of the structure of a domain name of an email address. As illustrated in FIG. 3, an email address (e.g., local-part@mail.example.co.jp) includes a top-level domain (jp), a second-level domain (co), a third-level domain (example), a fourth-level domain (mail) and a local part (local-part). The domain name corresponds to the part after @, that is, from the top-level domain to the fourth-level domain. The length of the local part corresponds to 64 characters or less, the length of each domain corresponds to 63 characters or less, the entire length of the domain name corresponds to 255 characters or less, and the entire length of the email address corresponds to 256 characters or less.

Figure 4:
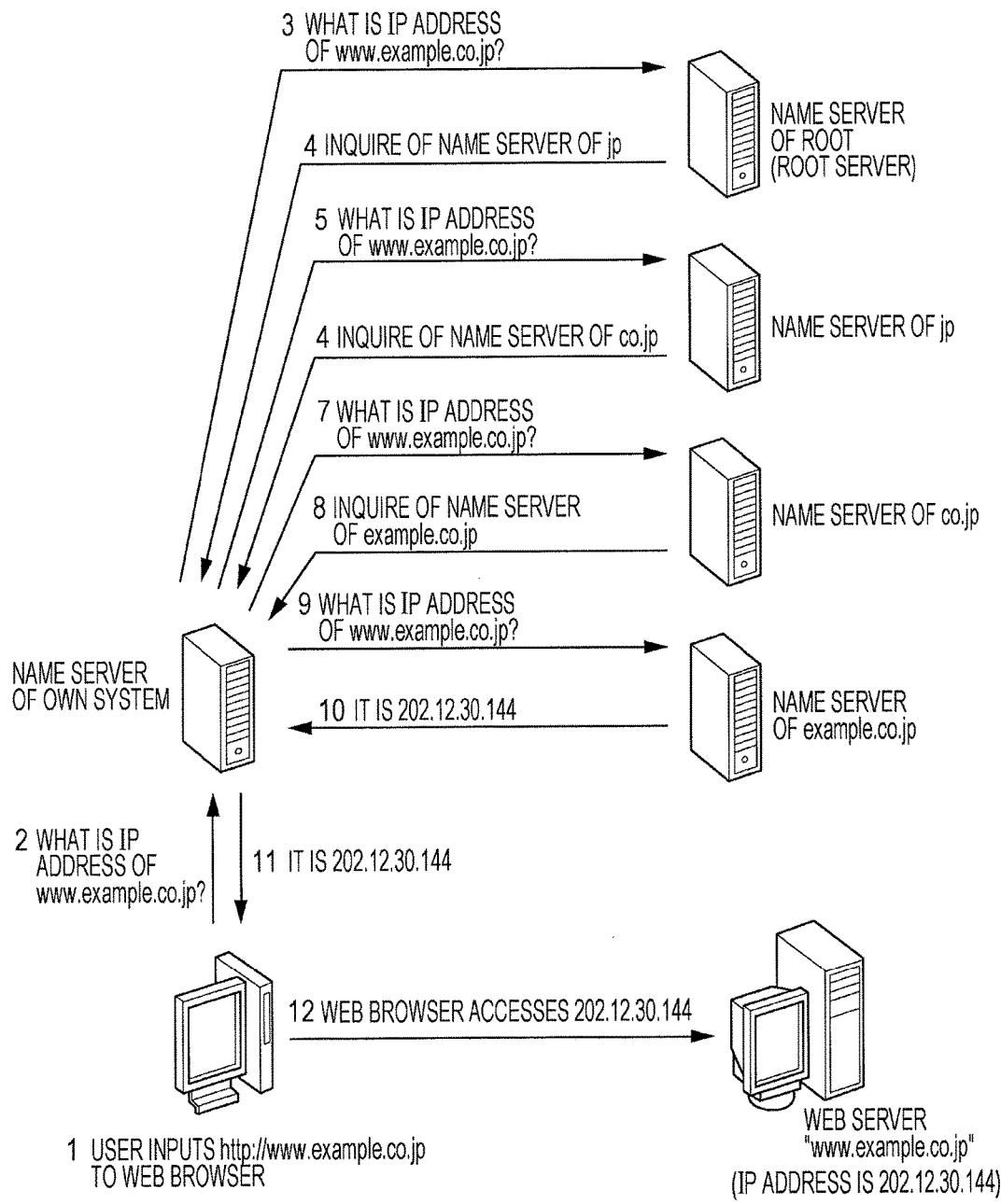
FIG. 4 is a diagram illustrating an example of a mechanism of name resolution in inquiry about a domain name.

FIG. 4 illustrates an example of a mechanism of name resolution in which an IP address corresponding to a domain name is obtained through inquiry about the domain name. As illustrated in FIG. 4, in a case where a user inputs "http://www.example.co.jp/" in a web browser by operating a client terminal, the client terminal first inquires of a name server of a system to which the client terminal belongs about the IP address of the domain name "www.example.co.jp". Subsequently, the name server of the system inquires of a root server about the IP address of "www.example.co.jp", and the root server transmits the top-level domain (jp). Subsequently, the name server of the system inquires of the name server of jp about the IP address of "www.example.co.jp", and the name server of jp transmits the top-level domain and the second-level domain (co.jp). Subsequently, the name server of the system inquires of the name server of co.jp about the IP address of "www.example.co.jp", and the name server of co.jp transmits the top-level domain, the second-level domain, and the third-level domain (example.co.jp). Subsequently, the name server of the system inquires of the name server of example.co.jp about the IP address of "www.example.co.jp", and the name server of example.co.jp transmits the IP address (202.12.30.144). The client terminal obtains the IP address (202.12.30.144) corresponding to "www.example.co.jp" from the name server of the system, and accordingly the web browser becomes capable of accessing "202.12.30.144". In the case of an email address, the mail server corresponding to the email address may be specified by inquiring the IP address of the domain name (mail.example.co.jp) of the email address.

As a result of the above-described inquiry about the domain name using the individual communication interfaces, it is determined whether or not the IP address is resolved (S103). In this case, the IP address is obtained using only any one of the first communication interface 22 and the second communication interface 24 (S104), or the IP address is obtained using both the first communication interface 22 and the second communication interface 24 (S105), or the IP address is not obtained using any communication interface (S106).

As a result of the inquiry about the domain name, in a case where the IP address is not obtained using any communication interface (S106), the process ends without transmitting an email.

As a result of the inquiry about the domain name, in a case where the IP address is obtained using only any one of the first communication interface 22 and the second communication interface 24 (S104), or in a case where the IP address is obtained using both the first communication interface 22 and the second communication interface 24 (S105), the mail server corresponding to the destination email address is specified. However, even if the mail server is specified, it is not certain whether or not the email will reach the mail server.

Subsequently, a communication route from the communication interface with which the IP address has been obtained to the obtained IP address (mail server) is searched for (S107).

As a method for searching for a communication route, a traceroute command ("tracert" in Windows (registered trademark)) is used in this exemplary embodiment. With the execution of the traceroute command, the IP address of a relay device (router, gateway, etc.) that connects hosts may be obtained. In this exemplary embodiment, the IP address of a relay device located between a communication interface included in the image processing apparatus 10 and the mail server corresponding to the destination email address is searched for by using the traceroute command.

Figures 5, 6:
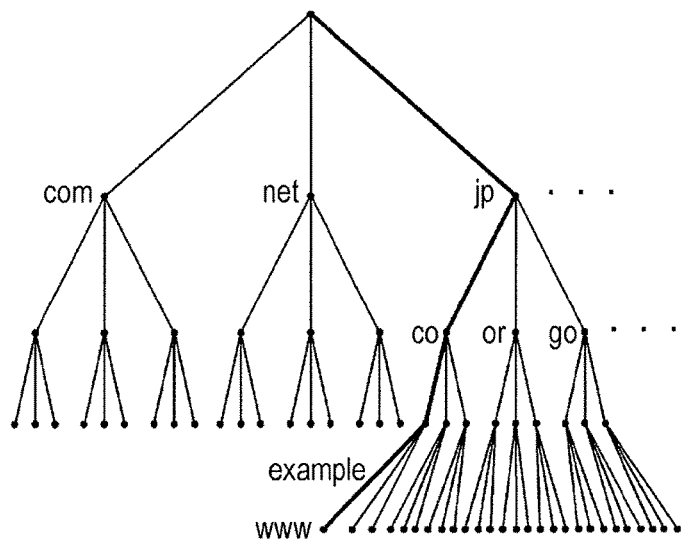
FIG. 5 is a diagram illustrating an example of a result obtained by executing a traceroute command.
FIG. 6 is a diagram illustrating the category of classes in a domain name space.

FIG. 5 is a diagram illustrating an example of a result obtained by executing the traceroute command. As illustrated in FIG. 5, upon a host name as a target of search for a communication route (for example, host2.isp.com) being specified, four pieces of route information are displayed, which indicates that the route reaches the fourth search target (host2.isp.com) via the first to third relay devices in display order (rt1.isp.xx.jp, rt2.isp.xx.jp, gw.isp.com). The route information includes response times to relay points (results of three trials, in units of milliseconds), and the host names and IP addresses of the relay devices.

Accordingly, in accordance with whether or not the host names and IP addresses of the relay devices existing in the route extending from the communication interface included in the image processing apparatus 10 to the mail server corresponding to the destination email address may be obtained, it is determined whether or not there is a communication route extending from the communication interface included in the image processing apparatus 10 to the mail server corresponding to the destination email address (S108).

When it is determined in step S108 whether or not there is a communication route, the determination result is any one of (i) there is a communication route in only any one of the first communication interface 22 and the second communication interface 24 (S109), (ii) there are communication routes in both the first communication interface 22 and the second communication interface 24 (S110), and (iii) there is no communication route in any of the first communication interface 22 and the second communication interface 24 (S111).

As a result of step S108, in a case where there is a communication route in only any one of the first communication interface 22 and the second communication interface 24 (S109), the communication interface in which the communication route exists is determined to be the communication interface to be used (S112). Subsequently, the determined communication interface is selected, and an email is transmitted to the IP address obtained in step S103.

As a result of step S108, in a case where there are communication routes in both the first communication interface 22 and the second communication interface 24 (S110), the types of networks to which individual relay devices are connected are obtained from an execution result of the traceroute command, and it is determined whether or not both the communication routes include the Internet (S114). Specifically, it is determined, using route information obtained from an execution result of the traceroute command, whether or not there is a relay device connected to the Internet. If there is not a relay device connected to the Internet (NO in S114), the communication interface is determined to be the interface to be used (S112).

In step S114, although either communication interface may be used to transmit an email because there are communication routes in both the communication interfaces, a user is allowed to select a more appropriate communication interface. Among the existing communication routes, in a communication route where there is not a relay device connected to the Internet, a mail server may be accessed only through an intranet, for example, but unnecessary transmission of an email to the external Internet may be prevented by selecting the communication route.

The determined communication interface is selected, and an email is transmitted to the IP address obtained in step S103 (S113).

In a case where it is determined in step S114 that both the communication routes include the Internet (YES in S114), the number of relay devices (hops) existing between each of the first communication interface 22 and the second communication interface 24 and the mail server is obtained from the execution result of the traceroute command (S115). Subsequently, the number of hops between the first communication interface 22 and the mail server is compared with the number of hops between the second communication interface 24 and the mail server, and the communication interface corresponding to a smaller number of hops is determined to be the communication interface to be used (S116). Subsequently, the determined communication interface is selected, and an email is transmitted to the IP address obtained in step S103 (S113).

As a result of step S108, in a case where there is not a communication route in any communication interface (S111), the process ends without transmitting an email.

The present invention is not limited to the above-described exemplary embodiment.

Every time transmission of an email is finished in the process of transmitting scan data, the controller 12 stores a destination email address and a used communication interface in the storage unit 14 in association with each other, and accumulates them as a history database.

When executing the process of transmitting scan data, the controller 12 refers to the history database stored in the storage unit 14 and determines whether or not the destination email address input by the user is included therein. In a case where it is determined that the destination email address input by the user is included in the history database, an email may be transmitted using the communication interface associated with the destination email address input by the user. In a case where it is determined that the destination email address input by the user is not included in the history database, the process may be performed from step S102.

In a case where there are communication routes in both the communication interfaces, a method for selecting any one of the communication interfaces is not limited to the method used in step S114, and the following process may be performed. First, the domain name of the destination email address input by the user is analyzed, and the class to which the destination server belongs is categorized in a domain name space. FIG. 6 is a diagram illustrating the category of classes in a domain name space. As illustrated in FIG. 6, categorization is performed using a domain name, for example, within a group, within a company, within associated companies, within a county, and in the world. Also, the analyzed class to which the destination server belongs is compared with the domain names held in the history database. In a case where the history database includes a domain name close to the class to which the destination server belongs, the communication interface associated with the domain name is determined to be the communication interface to be used.

In a case where the communication interface determined to be the communication interface to be used is different from the result obtained from the history database, the determined communication interface is used. Before an email is transmitted, the user is notified that there is a possibility that communication failure occurs, and that a communication interface different from the previously used communication interface is used, so that an email is not transmitted to an unintended network.

Figure 2:
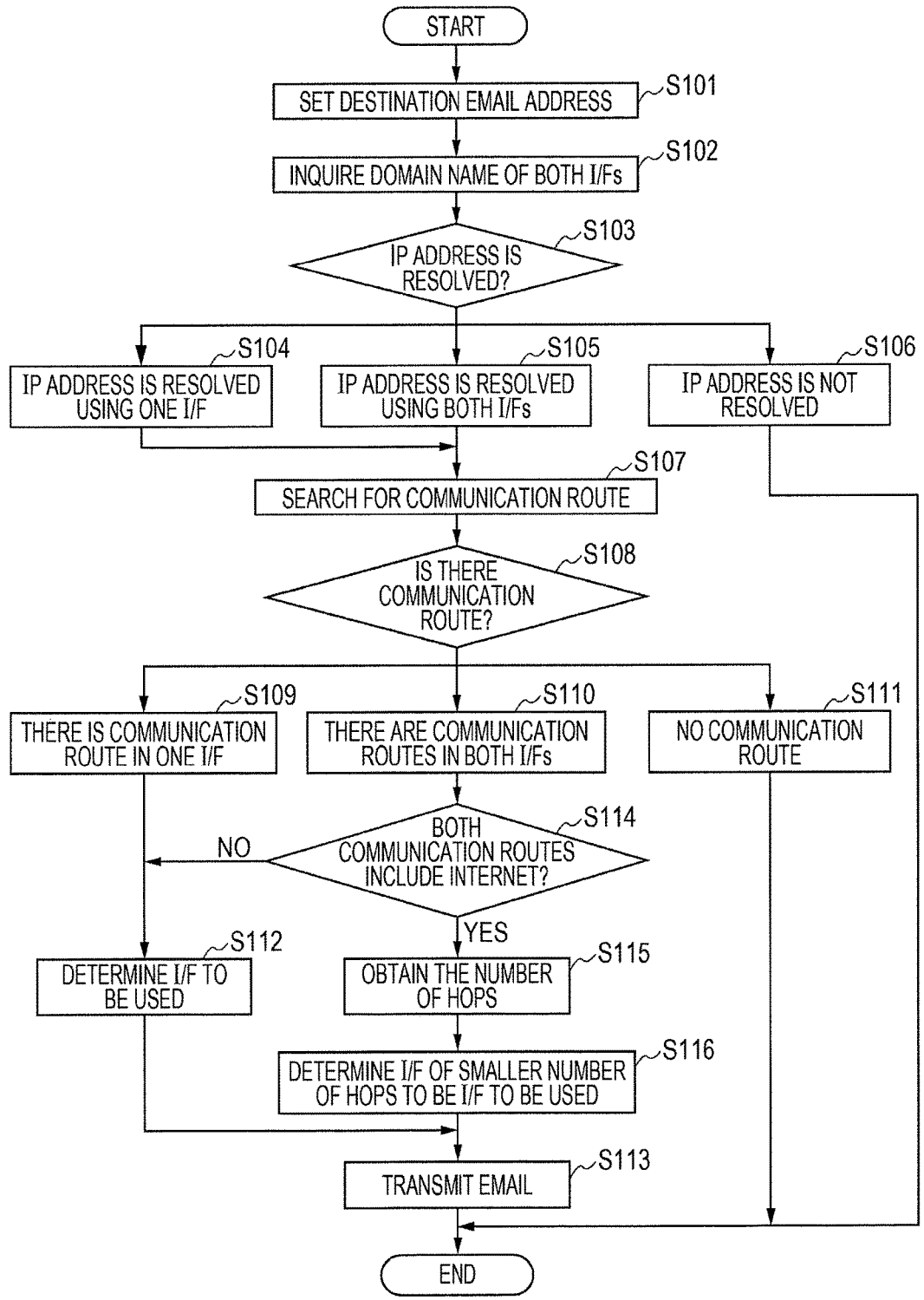
FIG. 2 is a flowchart illustrating an example of a flow of a process of transmitting scan data performed by the image processing apparatus according to the exemplary embodiment.

In step S104 in the flowchart illustrated in FIG. 2, as a result of inquiry about a domain name in each communication interface, in a case where an IP address is obtained in any one of the first communication interface 22 and the second communication interface 24, the communication interface in which the IP address has been obtained may be selected as an interface to be used, and an email may be transmitted to the obtained IP address.

In step S111 in the flowchart illustrated in FIG. 2, in a case where there is not a communication route in any communication interface as a result of determining whether or not there is a communication route, login information of the user of the image processing apparatus 10 may be compared with information about a destination email address. If both the pieces of information include the same domain name, an email may be transmitted via a communication interface connected to an intranet. Alternatively, the security levels of the networks connected to the first communication interface 22 and the second communication interface 24 may be referred to, and the communication interface to be used may be selected.

In this exemplary embodiment, in the process of transmitting scan data, image data read by the image reading unit 16 is transmitted by attaching it to an email. Alternatively, only URL information about image data may be transmitted without attaching the image data.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a first network interface card (NIC) configured to connect to a first network and communicate with an email server via the first network;
a second NIC configured to connect to a second network and communicate with the email server via the second network;
a processor; and
a memory storing computer-readable instructions executable by the processor, which when executed, cause the image processing apparatus to perform:
a first domain name resolution of a domain of the email server associated with an email address of a user to which scanned image data is to be transmitted by the image processing apparatus, using first network address information of the first NIC;
a second domain name resolution of the domain of the email server associated with the email address of the user to which the scanned image data is to be transmitted by the image processing apparatus, using second network address information of the second NIC;

selection of one of the first NIC and the second NIC to transmit the scanned image data to the email server, based on results of the first domain name resolution and the second domain name resolution; and
control of the selected one of the first NIC and the second NIC to transmit the scanned image data to the email server,
wherein the selection comprises:
a first determination of a first communication route from the first NIC to the email server and a second communication route from the second NIC to the email server, a determination that only one of the first communication route and the second communication route is a communication route over the Internet, and a selection of the one of the first NIC and the second NIC having a communication route that is not over the Internet; and
a second determination that the first communication route and the second communication route are over the Internet, and a selection of the one of the first NIC and the second NIC having a communication route having a fewest number of hops between the selected one of the first NIC and the second NIC and the email server.

2. The image processing apparatus according to claim 1, wherein the second determination comprises:
a first trace of a route from the first NIC to the email server; and
a second trace of a route from the second NIC to the email server, and
wherein the selection of the one of the first NIC and the second NIC comprises selection of the one of the first NIC and the second NIC based on a fewest number of first hops between the first NIC and the email server and second hops between the second NIC and the email server, based on results of the first trace and the second trace.

3. An image processing method performed by an image processing apparatus for transmitting scanned image data to an email address of a user, the image processing method comprising:
performing a first domain name resolution of a domain of an email server associated with the email address of the user to which scanned image data is to be transmitted by the image processing apparatus, using first network address information of a first network interface card (NIC) of the image processing apparatus connected to a first network;
performing a second domain name resolution of the domain of the email server associated with the email address of the user to which the scanned image data is to be transmitted by the image processing apparatus, using second network address information of a second NIC of the image processing apparatus connected to a second network;
selecting one of the first NIC and the second NIC to transmit the scanned image data to the email server, based on results of the first domain name resolution and the second domain name resolution; and
transmitting the scanned image data to the email server using the selected one of the first NIC and the second NIC,
wherein the selecting comprises:
determining a first communication route from the first NIC to the email server and a second communication route from the second NIC to the email server, determining that only one of the first communication route and the second communication route is a communication route over the Internet, and selecting the one of the first NIC and the second NIC having a communication route that is not over the Internet; and determining that the first communication route and the second communication route are over the Internet, and selecting the one of the first NIC and the second NIC having a communication route having a fewest number of hops between the selected one of the first NIC and the second NIC and the email server.

4. A non-transitory computer readable medium storing a program causing an image processing apparatus to execute a method of transmitting scanned image data to an email address of a user, the method comprising:

performing a first domain name resolution of a domain of an email server associated with the email address of the user to which scanned image data is to be transmitted by the image processing apparatus, using first network address information of a first network interface card (NIC) of the image processing apparatus connected to a first network;

performing a second domain name resolution of the domain of the email server associated with the email address of the user to which the scanned image data is to be transmitted by the image processing apparatus, using second network address information of a second NIC of the image processing apparatus connected to a second network;

selecting one of the first NIC and the second NIC to transmit the scanned image data to the email server, based on results of the first domain name resolution and the second domain name resolution; and transmitting the scanned image data to the email server using the selected one of the first NIC and the second NIC, wherein the selecting comprises:
determining a first communication route from the first NIC to the email server and a second communication route from the second NIC to the email server, determining that only one of the first communication route and the second communication route is a communication route over the Internet, and selecting the one of the first NIC and the second NIC having a communication mute that is not over the Internet; and determining that the first communication route and the second communication route are over the Internet, and selecting the one of the first NIC and the second NIC having a communication route having a fewest number of hops between the selected one of the first NIC and the second NIC and the email server.

5. An image processing apparatus comprising:

first network interface card (NIC) configured to connect to a first network and communicate over with an email server via the first network, wherein the first network comprises a local intranet;

a second NIC configured to connect to a second network and communicate with the email server via the second network, wherein the second network comprises an external network connected to the image processing apparatus via the Internet;

a processor; and a memory storing computer-readable instructions executable by the processor, which when executed, cause the image processing apparatus to perform:

determination of a secure transmission route from the first NIC to the email server via the local intranet and determination of an insecure transmission route from the second NIC to the email server via the Internet and selection of the first NIC to transmit scanned image data to the email server, based on a result of the determination of the secure transmission route and the insecure transmission route;

determination of a first insecure transmission route from the first NIC to the email server via the local intranet and determination of a second insecure transmission route from the second NIC to the email server via the Internet and selection one of the first NIC and the second NIC to transmit scanned image data to the email server, based on a fewest number of hops between the selected one of the first NIC and the second NIC and the email server; and control of the selected first NIC or second NIC to transmit the scanned image data to the email server.

6. The image processing apparatus according to claim 5, wherein the determination of the secure transmission route and the first insecure transmission route comprises performing a first trace of a route from the first NIC to the email server, and wherein the determination of the insecure transmission route and the second insecure transmission route comprises performing a second trace of a route from the second NIC to the email server.

* * * * *